(12) United States Patent
El-Dasher et al.

(10) Patent No.: US 10,569,363 B2
(45) Date of Patent: Feb. 25, 2020

(54) SYSTEM AND METHOD FOR HIGH POWER DIODE BASED ADDITIVE MANUFACTURING

(71) Applicant: Lawrence Livermore National Security, LLC, Livermore, CA (US)

(72) Inventors: Bassem S. El-Dasher, Livermore, CA (US); Andrew Bayramian, Manteca, CA (US); James A. Demuth, Mountain View, CA (US); Joseph C. Farmer, Tracy, CA (US); Sharon G. Torres, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 47 days.

(21) Appl. No.: 15/145,402

(22) Filed: May 3, 2016

(65) Prior Publication Data
US 2016/0243652 A1 Aug. 25, 2016

Related U.S. Application Data

(60) Continuation of application No. 14/988,190, filed on Jan. 5, 2016, now Pat. No. 9,855,625, which is a
(Continued)

(51) Int. Cl.
*B22F 3/105* (2006.01)
*B23K 26/342* (2014.01)
(Continued)

(52) U.S. Cl.
CPC .......... *B23K 26/342* (2015.10); *B22F 3/1055* (2013.01); *B23K 26/042* (2015.10);
(Continued)

(58) Field of Classification Search
CPC .... B22F 3/1055; B23K 26/066; B29C 64/153
See application file for complete search history.

(56) References Cited

U.S. PATENT DOCUMENTS

| | | | |
|---|---|---|---|
| 4,247,508 A | 1/1981 | Housholder | |
| 4,247,508 B1 | 1/1981 | Housholder | |

(Continued)

FOREIGN PATENT DOCUMENTS

| | | |
|---|---|---|
| JP | 03258480 B2 | 11/1991 |
| JP | H071593 A | 1/1995 |

(Continued)

OTHER PUBLICATIONS

Extended European Search Report dated Oct. 24, 2016 corresponding to EP Application No. 14760359.1, 9 pages.
(Continued)

*Primary Examiner* — James Sanders
(74) *Attorney, Agent, or Firm* — Harness, Dickey & Pierce, PLC

(57) ABSTRACT

A system is disclosed for performing an Additive Manufacturing (AM) fabrication process on a powdered material forming a substrate. The system may make use of a diode array for generating an optical signal sufficient to melt a powdered material of the substrate. A mask may be used for preventing a first predetermined portion of the optical signal from reaching the substrate, while allowing a second predetermined portion to reach the substrate. At least one processor may be used for controlling an output of the diode array.

21 Claims, 6 Drawing Sheets

Related U.S. Application Data division of application No. 13/785,484, filed on Mar. 5, 2013, now Pat. No. 9,308,583.

(51) Int. Cl.

| | | |
|---|---|---|
| *B29C 64/153* | (2017.01) | |
| *B23K 26/042* | (2014.01) | |
| *B23K 26/0622* | (2014.01) | |
| *B23K 26/066* | (2014.01) | |
| *B23K 26/06* | (2014.01) | |
| *B23K 26/144* | (2014.01) | |
| *B33Y 80/00* | (2015.01) | |
| *B33Y 30/00* | (2015.01) | |
| *C22C 32/00* | (2006.01) | |
| *B33Y 50/02* | (2015.01) | |

(52) U.S. Cl.
CPC ........ *B23K 26/066* (2015.10); *B23K 26/0622* (2015.10); *B23K 26/0643* (2013.01); *B23K 26/144* (2015.10); *B29C 64/153* (2017.08); *B33Y 30/00* (2014.12); *B33Y 80/00* (2014.12); *B22F 2003/1056* (2013.01); *B22F 2003/1057* (2013.01); *B33Y 50/02* (2014.12); *C22C 32/0026* (2013.01); *Y02P 10/295* (2015.11)

(56) References Cited

U.S. PATENT DOCUMENTS

| | | | |
|---|---|---|---|
| 4,944,817 A | 7/1990 | Bourell et al. | |
| 5,236,637 A | 8/1993 | Hull | |
| 5,314,003 A | 5/1994 | Mackay | |
| 5,382,308 A | 1/1995 | Bourell et al. | |
| 5,393,482 A | 2/1995 | Benda et al. | |
| 5,640,667 A | 6/1997 | Freitag et al. | |
| 5,674,414 A | 10/1997 | Schweizer | |
| 6,054,192 A | 4/2000 | Otsuka et al. | |
| 6,215,093 B1 | 4/2001 | Meiners et al. | |
| 7,088,432 B2 | 8/2006 | Zhang | |
| 9,107,434 B2 | 8/2015 | Singh | |
| 2002/0093115 A1 | 7/2002 | Jang et al. | |
| 2004/0200812 A1 | 10/2004 | Grewell et al. | |
| 2005/0083498 A1 | 4/2005 | Jeng et al. | |
| 2009/0020901 A1 | 1/2009 | Schillen et al. | |
| 2010/0140849 A1 | 6/2010 | Comb et al. | |
| 2010/0176539 A1 | 7/2010 | Higashi et al. | |
| 2010/0323301 A1 | 12/2010 | Tang | |
| 2011/0019705 A1 | 1/2011 | Adams et al. | |
| 2011/0033887 A1 | 2/2011 | Fang et al. | |
| 2011/0190904 A1 | 8/2011 | Lechmann et al. | |
| 2013/0001834 A1 | 1/2013 | El-Siblani et al. | |
| 2013/0004680 A1 | 1/2013 | Godfrey et al. | |
| 2013/0095603 A1 | 4/2013 | Cabal | |
| 2013/0136868 A1 | 5/2013 | Bruck et al. | |
| 2014/0361463 A1* | 12/2014 | DeSimone | B33Y 30/00 264/401 |
| 2015/0048075 A1 | 2/2015 | Pedrosa et al. | |

FOREIGN PATENT DOCUMENTS

| | | |
|---|---|---|
| JP | 2001-504897 A | 4/2001 |
| JP | 2001137685 A | 5/2001 |
| JP | 2011504819 A | 2/2011 |
| JP | 2012145613 A | 8/2012 |
| WO | 2011111029 A1 | 9/2011 |
| WO | 2012125118 A1 | 9/2012 |
| WO | 2013024297 A1 | 2/2013 |

OTHER PUBLICATIONS

Helbert, John N. "Handbook of VLSI microlithography," 2d Ed., Hoyes Publications, New York, NY (2001), 11 pp.

Tolochko, N. K., et al. "Absorptance of power materials suitable for laser sintering," Rapid Prototyping Journal, vol. 6, No. 3 (2000), pp. 155-160.

\* cited by examiner

Assumptions:
- Solid emissivity of 0.3
- Molten emissivity of 0.1
- 1cm thick base plate with outer edge held at 25C
- Environment at 25C
- 30um diameter powder in a 90um thick powder layer

| Material | Avg. Power Flux Required [W/cm²] |
|---|---|
| Al | 12 |
| Fe | 170 |
| Ti | 220 |
| W | 2,900 |

FIGURE 3

SYSTEM AND METHOD FOR HIGH POWER DIODE BASED ADDITIVE MANUFACTURING

CROSS-REFERENCE TO RELATED APPLICATIONS

This application is a continuation of U.S. patent application Ser. No. 14/988,190, filed Jan. 5, 2016, which is a divisional of U.S. patent application Ser. No. 13/785,484, filed on Mar. 5, 2013 (now U.S. Pat. No. 9,308,583). The entire disclosures of each of the above applications are incorporated herein by reference.

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to Additive Manufacturing systems and techniques for making three dimensional articles and parts, and more particularly to a system and method for performing Additive Manufacturing using a high power diode system.

BACKGROUND

The statements in this section merely provide background information related to the present disclosure and may not constitute prior art.

Additive Manufacturing ("AM"), also referred to as 3D printing, is a manufacturing technique in which material is added sequentially, layer by layer, in order to build a part. This is in contrast to traditional machining, where the part starts as a block of material that is then whittled down to the final desired shape. With AM fabrication, a directed power source is used to agglomerate material (typically powder) into a final, near net-shape article. Three dimensional articles are manufactured one layer at a time as an assemblage of two-dimensional sections. One important advantage of AM fabrication is that complex shapes (e.g. parts with internal features) can be realized. Another important advantage is that the material required is limited to that used to form the final part. Thus, AM fabrication has the benefit of very little material loss. This is especially important for expensive/tightly controlled materials.

The use of AM for metal fabrication is relatively recent. Historically, plastics have been the focus of commercial systems that employ AM. Nevertheless, the use of metals with AM is highly commercially and technologically important because the majority of engineered structures rely heavily on metals. Metal AM requires a relatively high power, highly focused laser beam (typically on the order of 100 W-1000 W) to melt, fuse, and/or sinter metallic powder. The metal powder is typically placed in a powder bed during the AM process. The laser beam is rastered along the powder surface to make a two-dimensional section per pass. Once each layer is completed, the powder bed retracts and new powder is layered on top of the just-completed layer. Considering that a typical layer thickness is only about 50-100 microns, it can be seen how this rastering is the most time consuming step. This is the principal reason why objects that would only take two to three hours to machine using traditional machining methods may take up to eight hours or more using AM. Moreover, due to the necessity of rastering the laser beam, the maximum part size can be limited. Presently a 25 cm×25 cm area part size is the largest part size that can be made with an AM technique that involves rastering the laser beam. Accordingly, there is a strong desire to reduce the time required to manufacture objects, and particularly metal objects, using AM. One important challenge that the present disclosure addresses is overcoming this relatively slow speed necessitated by the raster scanning operation employed with a conventional AM fabrication process.

SUMMARY

In one aspect the present disclosure relates to a method for performing Additive Manufacturing (AM). The method may comprise irradiating a powdered layer of a substrate using a pulsed optical signal sufficient to irradiate at least a substantial portion of an entire two dimensional area within which the substrate is positioned. The method may further include using a mask to selectively rotate and block portions of the pulsed optical signal from reaching the first layer of the substrate, wherein the mask absorbs substantially no optical energy from the optical signal as the optical signal passes therethrough. The method may further involve placing a second layer of powdered material over the first layer and irradiating the second layer using the pulsed optical signal while using the mask to selectively block additional portions of the pulsed optical signal from reaching the second layer of the substrate.

In another aspect the present disclosure relates to a method for performing Additive Manufacturing (AM) which involves generating an optical signal toward a powdered material forming a substrate. The optical signal is sufficient to irradiate an entire two dimensional area of the substrate. The method further involves using a liquid crystal polarization rotator to receive the optical signal before the optical signal reaches the substrate, and to control the liquid crystal polarization rotator to act as a mask. The liquid crystal polarization rotator is controlled to act as a mask by controlling a first component thereof to rotate a first portion of the optical signal passing therethrough while allowing a second portion of the optical signal to pass therethrough without being rotated. A second component of the liquid crystal polarization rotator is controlled to reject one of the first or second portions of the optical signal received from the first component, and thus to prevent the one of the first or second portions of the optical signal from reaching the powdered material, while the second component allows the other one of the first or second portions of the optical signal to reach the powdered material.

In still another aspect the present disclosure relates to a method for performing Additive Manufacturing (AM) comprising a plurality of operations involving using a laser diode to generate an optical signal toward a first layer of powdered material which forms a substrate. The optical signal is sufficient to irradiate an entire two dimensional area of the powdered material. The method further involves using a liquid crystal polarization rotator to receive the optical signal before the optical signal reaches the first layer of powdered material, and controlling the liquid crystal polarization rotator to act as a mask. The liquid crystal polarization rotatator is controlled to act as a mask by controlling a first component thereof to rotate a first portion of the optical signal passing therethrough while allowing a second portion of the optical signal to pass therethrough without being rotated. A second component of the liquid crystal polarization rotator is controlled to reject one of the first or second portions of the optical signal received from the first component. This prevents the one of the first or second portions of the optical signal from reaching the first layer of powdered material while the other one of the first or second portions of the optical signal is allowed to reach the first layer of powdered material, and thus to melt the first layer of powdered material. Subsequent to melting of the first layer of powdered material, a second layer of powdered material is applied on at least a portion of the first layer of powdered material. The laser diode and the liquid crystal polarization rotator are then further used to melt at least a portion of the second layer of powdered material.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way. In the drawings:

FIG. 3 is a chart illustrating the average power flux required to melt various types of metals;

DETAILED DESCRIPTION

Figure 1:
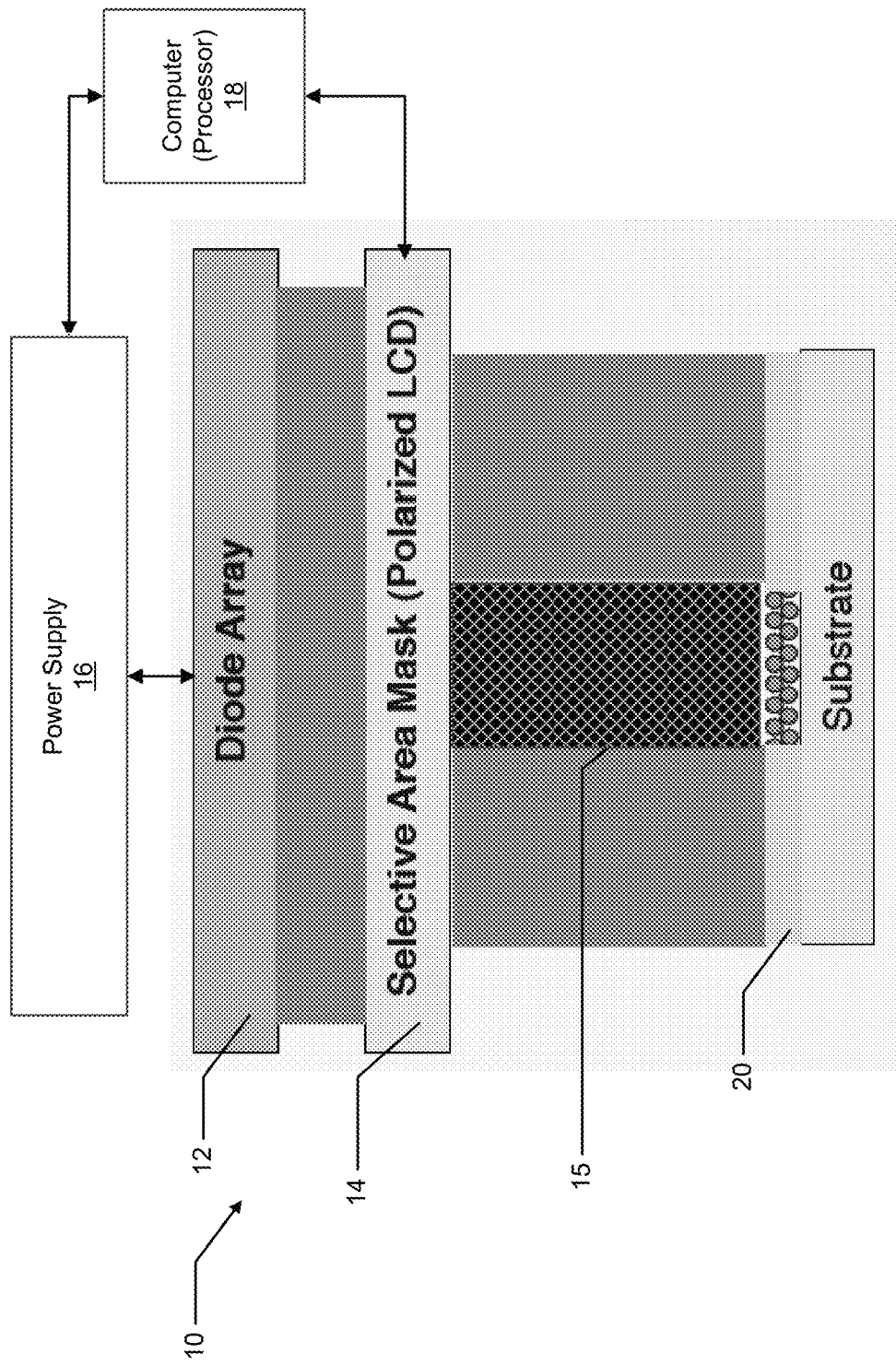
FIG. 1 is a diagrammatic view of one embodiment of the present system and method for performing an Additive Manufacturing ("AM") fabrication process using a high power diode array and a mask.

The following description is merely exemplary in nature and is not intended to limit the present disclosure, application, or uses. It should be understood that throughout the drawings, corresponding reference numerals indicate like or corresponding parts and features.

Referring to FIG. 1 a system 10 is shown in accordance with one embodiment of the present disclosure for performing an Additive Manufacturing ("AM") fabrication process. The system 10 may include a high power diode array 12 and a computer controlled, selective area mask 14 (hereinafter simply "mask 14"). A suitable power supply 16 may be used for providing electrical power to the diode array 12. A computer 18 or other suitable form of processor or controller may be used for controlling the power supply 16 to control the on/off application of power to the diode array 12 as well as selectively (i.e., digitally) controlling the mask 14 and shaping or focusing the optical beam. Optionally, separate processors or computers may be used to control the diode array 12 and the mask 14. Selectively electronically controlling the mask 14 with the computer 18 allows the optical beam from the diode array 12 to be prevented from reaching specific selected portions of powder that forms a substrate 20 (i.e., powder bed) so that those portions are irradiated by the beam. In FIG. 1 portion 15 is cross hatched to represent a portion of the output from the diode array 12 that does not reach the powdered material of the substrate 20.

Figure 4:
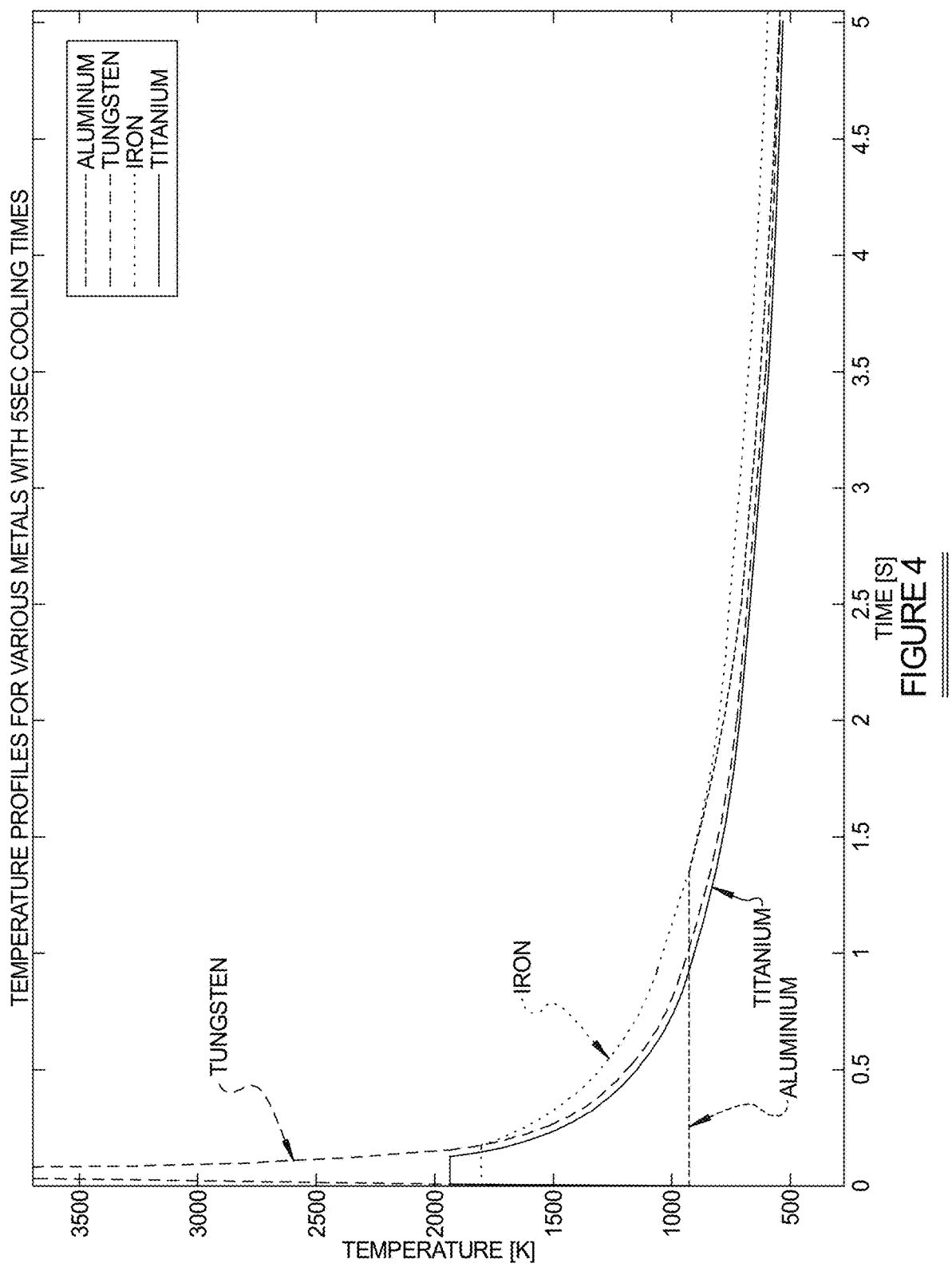
FIG. 4 is a graph that shows a plurality of curves representing various temperatures required to melt various materials, along with the time required to melt each material.

In one preferred form the diode array 12 may comprise a single large diode bar. Alternatively a plurality of diode bars located adjacent one another may be used to form the diode array 12. In one preferred form the diode array may be made up of arrays of diode bars each being about 1 cm×0.015 cm to construct a 25 cm×25 cm diode array. However, any number of diode bars may be used, and the precise number and configuration may depend on the part being constructed as well as other factors. Suitable diode bars for forming the diode array 12 are available from Lasertel of Tucson, Ariz., Oclaro Inc. of San Jose, Calif., nLight Corp. of Vancouver, Wash., Quantel Inc. of New York, N.Y., DILAS Diode Laser, Inc. of Tucson, Ariz., and Jenoptik AG of Jena, Germany, as well as many others. The diode array 12 is able to provide a minimum power density of about 10 kW/cm$^2$ and maximum >100 kW/cm$^2$ at two percent duty cycle. This makes it feasible to generate sufficient optical power to melt a wide variety of materials. FIG. 3 provides a table of the average power flux that has been calculated to melt various types of materials. FIG. 4 shows a graph that illustrates the effectiveness of the diode array 12 on a variety of metal powders (i.e., Aluminum, Titanium, Iron and Tungsten), at a power flux sufficient to melt all the materials. The calculations to obtain the graphs shown in FIG. 4 were performed in MATLAB with conductive and radiative losses taken into account. A conservative 30% absorptivity was assumed along with a powder layer thickness of 100 μm.

It will also be appreciated that a significant advantage of using a diode array comprised of one or more diode bars is that such an assembly is readily scalable. Thus, diode arrays of various sizes can be constructed to meet the needs of making a specific sized part. For example, the diode array 12 may be constructed to have a one square meter area, which would allow correspondingly large scale components to be constructed through an AM fabrication process, provided of course that a suitably sized powder bed is available to support fabrication of the part. Another significant advantage is that the system 10 can be integrated into existing AM fabrication systems with the added benefit of no moving parts. The system 10 allows for the AM fabrication of traditionally difficult to fabricate and join metal such as ODS (oxide dispersion strengthened) steels or any alloy traditionally formed using solid state (i.e. non-melt) processing techniques.

Figure 2:
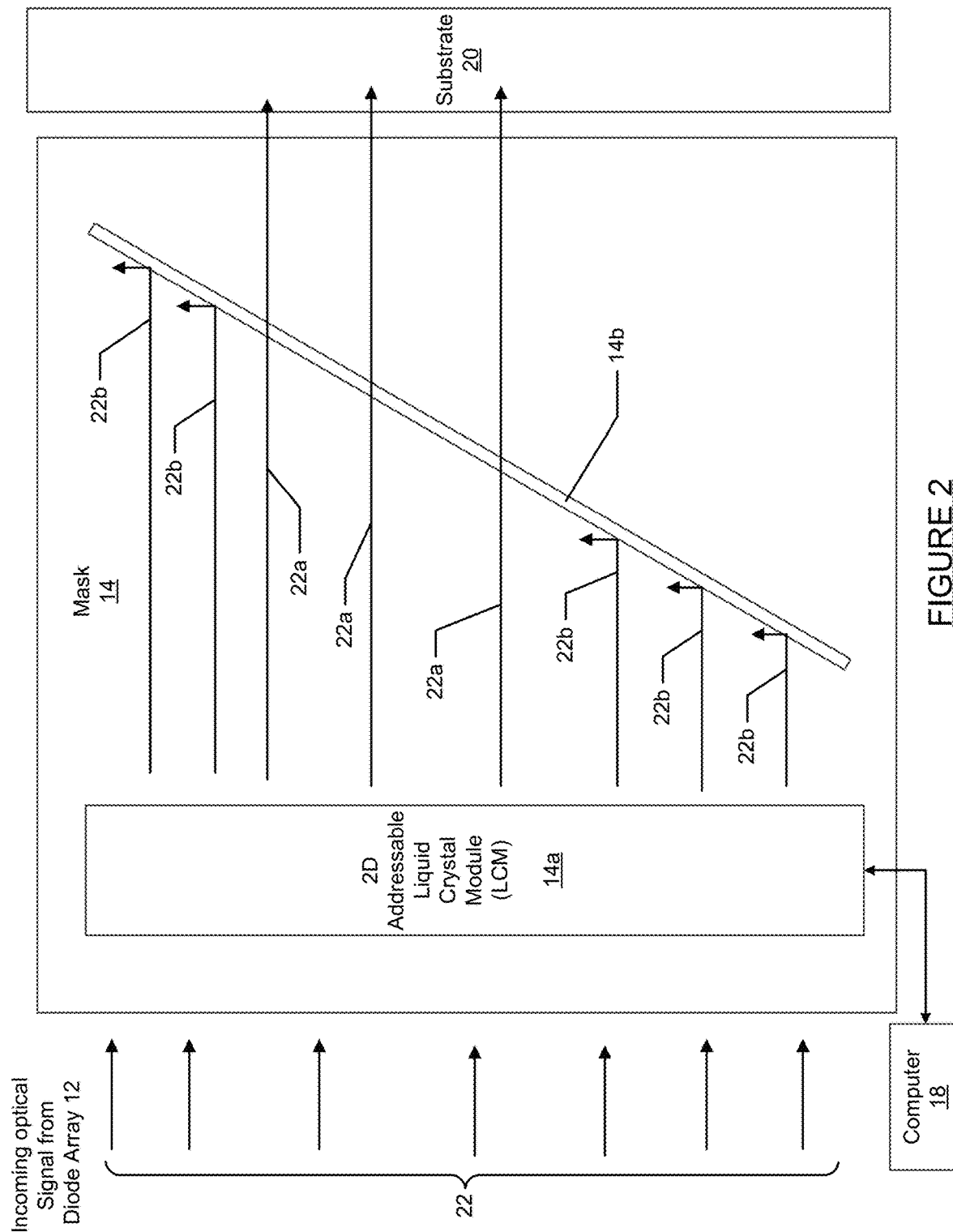
FIG. 2 is a diagrammatic side view of the system of FIG. 1 showing how a portion of the optical rays from the diode array are reflected by a polarizing mirror during the fabrication process to prevent them from reaching the substrate.

Referring to FIG. 2, in one preferred form the mask 14 forms a "liquid crystal polarization rotator" comprised of a liquid crystal module (LCM) 14a and a polarizing mirror 14b, in this example a polarizing mirror (hereinafter "polarizing mirror" 14b). The polarizing mirror 14b directs the light defined by the liquid crystal polarization rotator and shapes the optical pattern that irradiates the substrate 20. The LCM 14a that helps to form the mask 14 may be made up of one or more two dimensional, electronically (i.e., digitally) addressable arrays of pixels. Liquid crystal polarizers are commercially available and form two dimensional arrays of addressable pixels which work by changing the polarity of an incoming photon that is then rejected by a polarization element. However, with the system 10, the polarizing mirror 14b may form a discrete component of the mask 14 that may be used to help focus and/or shape the optical signal.

In FIG. 2 the mask 14 receives light 22 being output from the diode array 12 as the light irradiates the LCM 14a. Pixels of the LCM 14a are independently addressed using the computer 18 to reject light at specific select areas of the substrate 20. Using the LCM 14a and the polarizing mirror 14b to form the mask 14 enables the light generated by the diode array 12 to be controllably directed onto only selected areas of the substrate 20 as needed. In FIG. 2 light indicated by lines 22a is able to pass through the polarizing mirror 14b while light indicated by lines 22b is rejected by the polarizing mirror. An important advantage of using a computer controlled LCM 14a is that only a very small amount of optical energy is absorbed into the polarizing mirror 14b, thus making it feasible to prevent damage to the mirror.

During an actual AM fabrication operation, a first layer of powdered material may be acted on by the system by pulsing the diode array 12 to melt selected portions (or possibly the entire portion) of the first layer. A subsequent (i.e., second) layer of powdered material may then be added over the layer just acted on by the system 10 and the process would be repeated. The diode array 12 may be pulsed to melt one or more selected subportions (or possibly the entirety) of the second layer of material. With each layer the system 10 electronically controls the pixels of the mask 14 to selectively block specific, predetermined portions of the substrate 20 from being irradiated by the pulsed optical signal from the diode array 12. This process is repeated for each layer, with the computer 18 controlling the mask 14 so that, for each layer, one or more selected subportions (or possibly the entirety) of the powdered material is blocked by the mask 14 from being exposed to the pulsed optical signal. Preferably, an entire two dimensional area of each layer is melted or sintered at once by pulsing the diode array 12. However, it is just as feasible to raster scan the diode array 12 over the two dimensional area in the event the entire two dimensional area cannot be completely irradiated by the diode array.

An alternative to the addressable mask 14 is a non-addressable mask. A non-addressable mask may be a precision cut piece of metal (e.g., tungsten) that would simply block portions of the light beam. While such a machined mask can be used to build simple geometries, the full potential of the system 10 described herein will be maximized if an addressable mask such as mask 14 is used.

Figure 5:
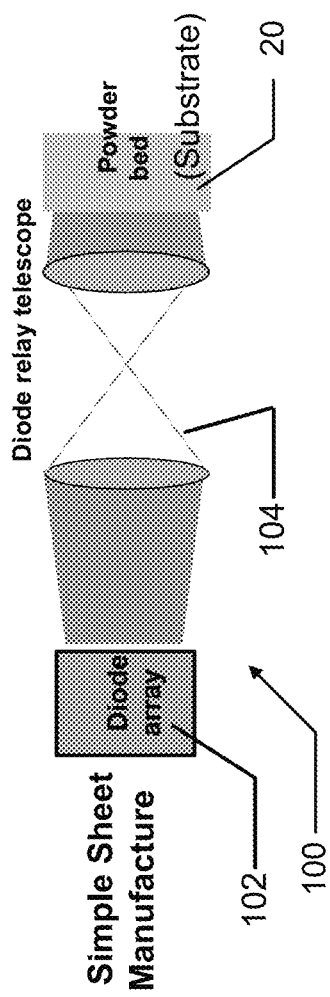
FIG. 5 shows an alternative form of the system of the present disclosure in which distinct "tiles" (predetermined areas) corresponding to pixels of the substrate are digitally controlled during the AM fabrication process.
Figure 6:
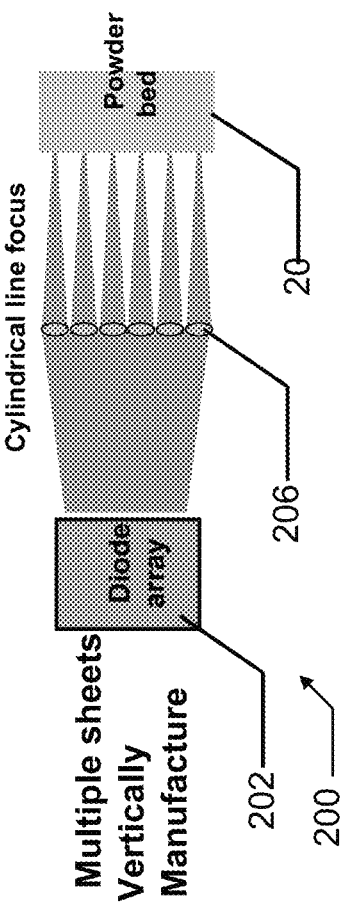
FIG. 6 is another alternative form of the system of the present disclosure in which a plurality of focusing lenses are used to simultaneously focus the output from the diode array onto specific sections of the substrate for simultaneously melting distinct, separate sheets of material.

Referring to FIGS. 5 and 6, two alternative systems 100 and 200 in accordance with additional implementations of the present disclosure are shown. System 100 includes a diode array 102 and a diode relay telescope 104. The diode relay telescope 104 is used to provide digital control over "tiles" within an array image to the "pixels" in the substrate 20 (powder bed). FIG. 6 illustrates a system 200 having a diode array 202 and a plurality of focusing lenses 206 that are used to focus the optical energy from the array onto a corresponding plurality of "sheets" representing the substrate 20.

The systems 10, 100 and 200 are able to melt and sinter each layer in a single "pass" or, put differently, in a single operation by pulsing the diode array 12. The need to raster scan an optical beam dozens, hundreds or more times, back and forth across a surface, is therefore eliminated. This significantly reduces the time required to melt and sinter each layer of powder material during the AM fabrication process.

Figure 7:
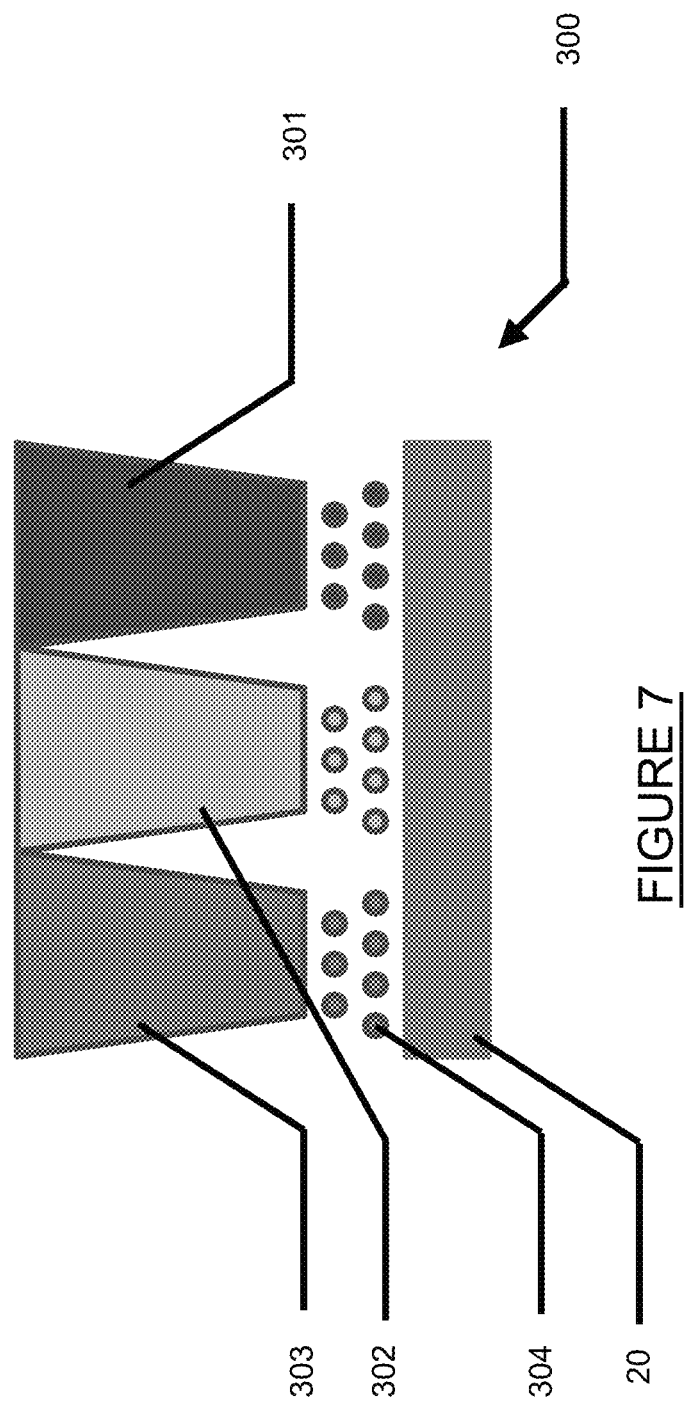
FIG. 7 is a diagrammatic side view of a method of deposition of different material types in powder form prior to illumination by diode array generated light to melt/sinter the dissimilar powders together.

Referring to FIG. 7, a method of deposition of different material types in powder form is illustrated in system 300. Nozzles 301, 302, and 303 are capable of depositing layers of different material powders 304 onto the substrate 20. The nozzle heads 301, 302 and 303 are rastered across the part surface covering it with material addressed by a programmable source. Both the irradiation from the diode array 12 and operation of the mask 14, as described in connection with the system 10, can be controlled such that each material deposited from the nozzles 301, 302 and 303 receives the correct amount of optical energy for a controlled melt or sintering.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A system for performing an Additive Manufacturing (AM) fabrication process on a powdered material forming a substrate, the system comprising:

a dynamically controllable, two dimensional mask having a two-dimensional array of addressable pixels;

an optical subsystem for generating an optical signal comprised of electromagnetic radiation sufficient to melt or sinter a powdered material of the substrate, the optical subsystem being controllable so as to generate a plurality of different power levels, with a specific one of said power levels being selectable based on a specific material being used to form a 3D part;

the optical subsystem being able to generate the electromagnetic radiation with an average power density of greater than 200 W/cm$^2$ over the duration of the signal, and producing a beam having an area sufficient to illuminate substantially a full area of the dynamically controllable two dimensional mask at one time, and the average power density being sufficient to melt a powdered material;

the dynamically controllable, two dimensional mask receiving the optical signal and controllably selecting portions of the optical signal passing therethrough such that a first selected portion of the optical signal passes through the mask, and a second selected portion of the optical signal also passes through the mask, the mask permitting one of the first and second selected second portions to reach the powdered material, and the mask causing the other one of the first and second selected portions to be prevented from reaching the powdered material, and the mask absorbing only a portion of the electromagnetic radiation;

at least one processor which dynamically controls both the mask and the optical subsystem, and is configured to adjust a power level of the optical signal taking into account a composition of the powdered material; and a relay telescope arranged upstream of the powdered material, relative to a direction of travel of the optical signal, the relay telescope being configured to receive an array image and to provide control over tiles within the array image to help facilitate melting in a single operation performed on each new layer of powdered material, in a layer-by layer sequence of operations.

2. The system of claim 1, wherein the optical subsystem comprises a diode array.

3. The system of claim 2, wherein the diode array is configured to provide the power density of at least about 10 kW/cm$^2$ to about 100 kW/cm$^2$ at a two percent duty cycle.

4. The system of claim 1, wherein the mask comprises:
a liquid crystal module; and
a polarizing element, the polarizing element operating to alter a polarization of the second portion of the optical signal after the second portion has passed through the liquid crystal module.

5. The system of claim 4, wherein the liquid crystal module comprises a computer controllable liquid crystal module configured to be digitally controlled by the processor.

6. The system of claim 4, wherein the polarizing element comprises a polarizing mirror.

7. A system for performing an Additive Manufacturing (AM) fabrication process on a powdered material forming a substrate, the system comprising:
a dynamically controllable mask having an addressable two dimensional array of pixels;
an optical subsystem configured to generate a pulsed optical signal forming electromagnetic radiation sufficient in optical intensity to melt a powdered material of the substrate, the optical subsystem being controllable so as to generate a plurality of different power levels, with a specific one of said power levels being selectable based on a specific material being used to form a 3D part;
the electromagnetic radiation able to produce a power density of greater than at least about 10 kW/cm$^2$ and the pulsed optical signal forming a beam having dimensions sufficient to span substantially an entire two-dimensional area of the mask at once, and to be applied for a time duration sufficient to melt a powdered material forming a powder bed, where the powder bed forms the substrate;
the mask configured to pass first and second portions of the optical signal through the mask, but to selectively control polarizations of the first or second portions to permit one of the first or second portions to reach the powdered material to form an array image, and thus to melt the powdered material, while preventing the other one of the first or second portions from reaching the powdered material;
a processor for determining which one or more pixels of the mask need to be controlled in a manner such that only the one of the first or second portions of the optical signal reach the powdered material, and controlling on and off operation of the optical subsystem to enable the beam of the optical subsystem to be applied to the powdered material after the mask has been controlled to define the first and second portions, and where the processor is used to control the optical subsystem and the mask to selectively define and fuse select subportions of each layer of the part in a layer-by-layer sequence of operations; and
a relay telescope arranged upstream of the powder bed, relative to a direction of travel of the pulsed optical signal, the relay telescope being configured to receive the array image and to provide control over tiles within the array image to help facilitate melting in a single operation performed on each new layer of powdered material, in the layer-by-layer sequence of operations.

8. The system of claim 7, wherein the mask forms a liquid crystal polarization rotator having a liquid crystal module and a polarizer interposed between the optical subsystem and the substrate, the liquid crystal polarization rotator operating to rotate a polarization of one or the other of the first or second portions of the pulsed optical signal passing therethrough while allowing the other to pass therethrough without being rotated, and the polarizer operating to reject the one of the first or second portions that has been rotated.

9. The system of claim 8, wherein the liquid crystal module of the mask includes a plurality of pixels arranged in a two dimensional pattern that are individually controlled.

10. The system of claim 7, wherein:
the optical subsystem comprises a diode array which is configured to be electronically controlled; and
wherein the processor is configured to electronically control the diode array to control on and off operation of the diode array.

11. The system of claim 7, wherein the mask is configured to be digitally controlled by the processor.

12. The system of claim 7, wherein the mask is electronically addressable by the processor to prevent selected areas of the substrate from being exposed to the pulsed optical signal from the optical subsystem.

13. The system of claim 7, wherein the mask comprises a polarizing element.

14. The system of claim 8, wherein the polarizing element comprises a polarizing mirror disposed at a 45 degree angle from a plane that the pulsed optical signal from the optical subsystem travels in.

15. The system of claim 7, wherein the optical subsystem comprises a diode array configured to generate a power output of at least about 10 kW/cm$^2$ at a duty cycle of about two percent.

16. A system for performing an Additive Manufacturing (AM) fabrication process on a powdered material forming a substrate, the system comprising:
a dynamically controllable mask having an addressable two dimensional array of pixels;
an optical subsystem for generating a pulsed optical signal sufficient in optical intensity to melt a powdered material of the substrate, the optical subsystem being controllable so as to generate a plurality of different power levels, with a specific one of said power levels being selectable based on a specific material being used to form a 3D part, and further creating the optical signal as a beam having an area which illuminates substantially an entire area of the mask at one time;
the optical subsystem able to generate the optical signal with an average power density of greater than 200 W/cm$^2$ over the duration of the signal;
the mask including a liquid crystal module having a plurality of addressable regions of pixels, with the pixels being independently controllable, and a polarizer disposed downstream of the liquid crystal module, the mask being controllable to pass a first portion of the optical signal through the mask without causing any polarization rotation of the first portion, and to pass a second portion of the optical signal through the mask but to cause a predetermined degree of polarization rotation of the second portion;
one of the first and second portions being used to melt the powdered material, and the other of the first and second portions not being used to melt the powdered material; and
a processor for dynamically controlling specific pixels of the mask, and operation of the optical subsystem, so that the optical signal is generated at select times, and with a selected power level, to melt only select portions of the powdered material in each new layer of powdered material, in a layer-by-layer sequence of operations; and a relay telescope arranged upstream of the powdered material, relative to a direction of travel of the pulsed optical signal, the relay telescope being configured to receive an array image and to provide control over tiles within the array image to help facilitate melting in a single operation performed on each new layer of powdered material; in the layer-by-layer sequence of operations.

17. The system of claim 16, wherein the liquid crystal module comprises a computer controllable liquid crystal module configured to be digitally controlled by the processor.

18. The system of claim 16, wherein the optical subsystem comprises a diode array which is comprised of a plurality of diode emitters.

19. The system of claim 16, wherein:
the optical subsystem is configured to be electronically controlled by the processor; and
wherein the processor is configured to electronically control the optical subsystem to control on and off operation of a diode array.

20. The system of claim 1, wherein the powdered material forming the substrate comprises a material that is substantially absorptive to the optical signal.

21. The system of claim 20, wherein the powdered material comprises at least one of Iron, Titanium, Aluminum, Tungsten and oxide dispersion strengthened (ODS) steel.

* * * * *